(12) United States Patent
Gollan

(10) Patent No.: US 11,907,801 B2
(45) Date of Patent: Feb. 20, 2024

(54) SYSTEM FOR ENCODING RESOURCE ACCESS CREDENTIAL IN BARCODE

(71) Applicant: The Work Shop Limited, Hamilton (NZ)

(72) Inventor: Melissa Linda Gollan, Hamilton (NZ)

(73) Assignee: THE WORK SHOP LIMITED

( * ) Notice: Subject to any disclaimer, the term of this patent is extended or adjusted under 35 U.S.C. 154(b) by 0 days.

(21) Appl. No.: 17/633,827

(22) PCT Filed: Aug. 10, 2020

(86) PCT No.: PCT/NZ2020/050086
§ 371 (c)(1),
(2) Date: Feb. 8, 2022

(87) PCT Pub. No.: WO2021/025564
PCT Pub. Date: Feb. 11, 2021

(65) Prior Publication Data
US 2022/0230005 A1    Jul. 21, 2022

(30) Foreign Application Priority Data
Aug. 8, 2019 (NZ) .......................... 756161

(51) Int. Cl.
*G06K 19/06* (2006.01)
*G06K 7/14* (2006.01)

(52) U.S. Cl.
CPC ..... *G06K 7/1413* (2013.01); *G06K 19/06028* (2013.01)

(58) Field of Classification Search
CPC ................... G06K 19/06037; G06K 19/06112
(Continued)

(56) References Cited

U.S. PATENT DOCUMENTS 6,679,421 B2 * 1/2004 Shin ................... G06Q 20/3274
235/382
10,380,580 B1 * 8/2019 Seetharam ....... G06K 19/06112
(Continued)

OTHER PUBLICATIONS

Patent Cooperation Treaty, Notification of Transmittal of International Search Report and Written Opinion of the ISA or the Declaration; International Search Report dated Oct. 26, 2020; 6 pages.
(Continued)

*Primary Examiner* — Paultep Savusdiphol
(74) *Attorney, Agent, or Firm* — Shumaker, Loop & Kendrick, LLP; Patrick B. Horne

(57) ABSTRACT

Systems for encoding resource access credentials in barcodes displayed on user devices, such as mobile phones, are described. A resource access credential authorising payment for a transaction relating to the purchase of goods or services is obtained, and a barcode encoding barcode data is generated, including at least a purchasing entity identifier, the resource access credential, and a user supplied transaction identifier. The barcode is displayed on the display of the user device, and read by an optical reader of merchant computing system. The merchant computing system requests payment for the transaction using the resource access credential, and produces a transaction data packet containing transaction data relating to the transaction, together with at least the purchasing entity identifier and user supplied transaction identifier.

13 Claims, 4 Drawing Sheets

(58) Field of Classification Search
USPC .................................... 235/494, 462.1, 375
See application file for complete search history.

(56) References Cited

U.S. PATENT DOCUMENTS

| | | | |
|---|---|---|---|
| 2009/0281904 A1* | 11/2009 | Pharris | G06Q 20/425 |
| | | | 455/566 |
| 2010/0138344 A1* | 6/2010 | Wong | G06Q 20/385 |
| | | | 705/35 |
| 2015/0262161 A1* | 9/2015 | McMullan et al. | G06Q 20/209 |
| | | | 705/39 |
| 2016/0019519 A1* | 1/2016 | Gollan | G06Q 20/209 |
| | | | 705/21 |
| 2018/0006821 A1* | 1/2018 | Kinagi | G06Q 20/4015 |
| 2019/0156167 A1* | 5/2019 | Singh | G06Q 20/3276 |

OTHER PUBLICATIONS

Patent Cooperation Treaty, Written Opinion of the International Search Authority dated Oct. 26, 2020; 5 pages.

* cited by examiner

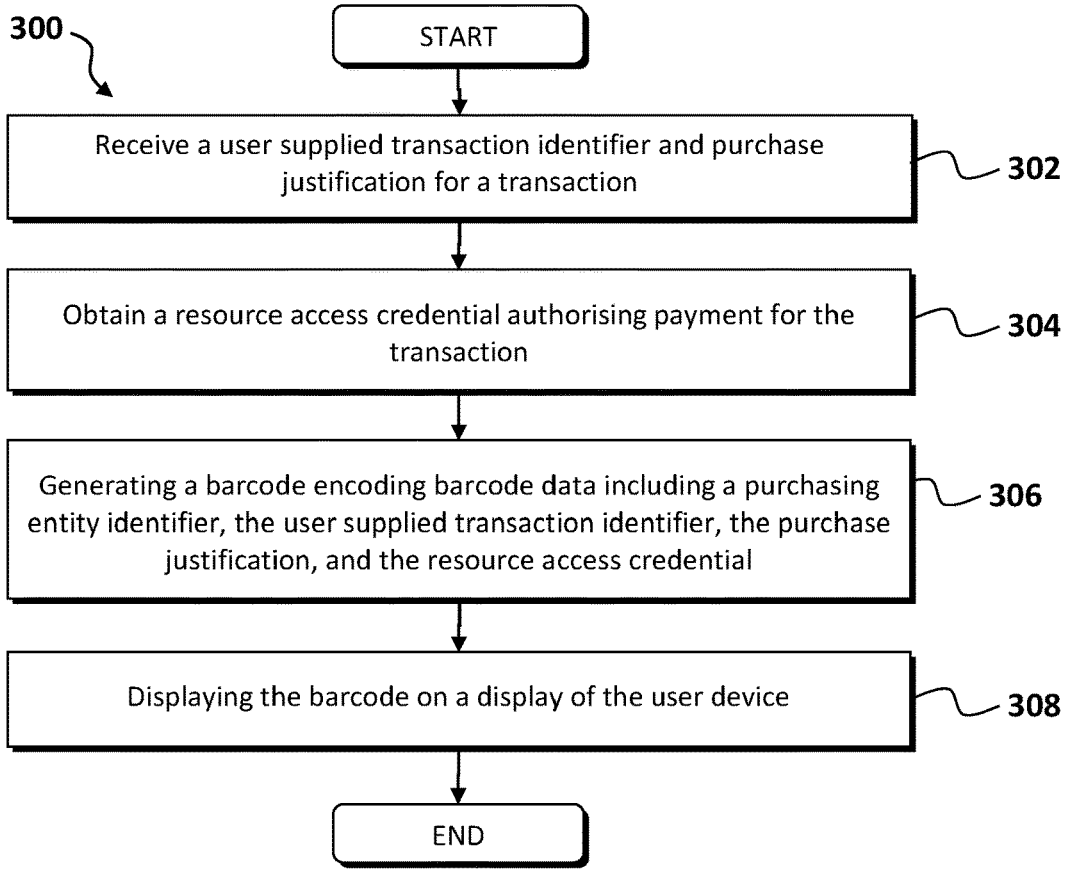
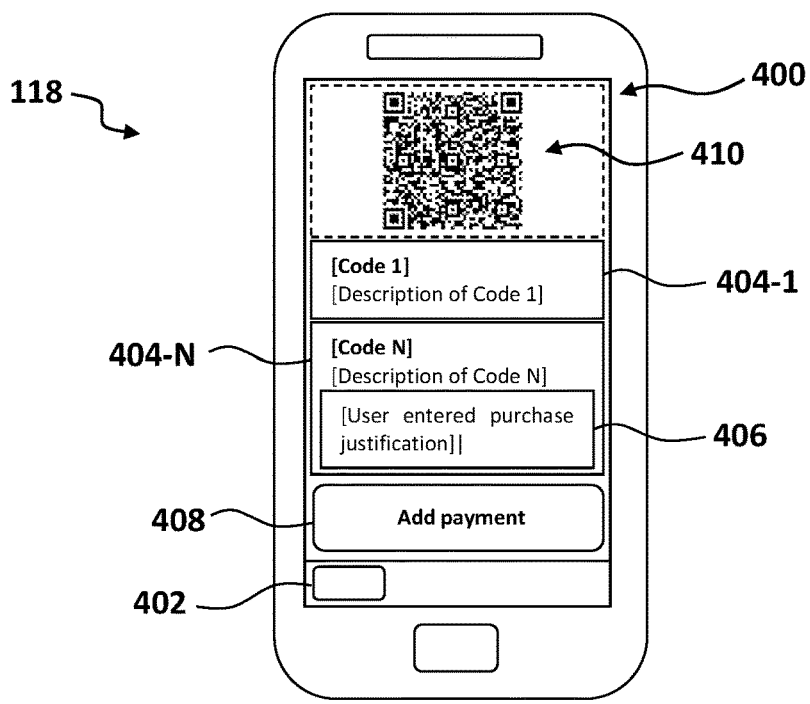

SYSTEM FOR ENCODING RESOURCE ACCESS CREDENTIAL IN BARCODE

TECHNICAL FIELD

Aspects of the present disclosure relate to systems for encoding resource access credentials in barcodes displayed on mobile devices.

STATEMENT OF CORRESPONDING APPLICATIONS

This application is based on the provisional specification filed in relation to New Zealand Patent Application No. 756161, the entire contents of which are incorporated herein by reference.

BACKGROUND

At present, expense management is a highly manual process that hinges on a purchaser's actions at the point of sale and retention of physical receipts. Typically, the purchaser must retain a merchant produced receipt for proof of purchase, product or service information, and tax details. A physical copy of the receipt is generally kept by the purchaser until being coded by the purchaser and reconciled in chronological order to the relevant statement, then submitted for scrutiny and tax purposes to their manager or business accounts person, who then passes this to the business accountant for annual returns processing.

While electronic data relating to the transaction is produced by the merchant's point of sale systems, particularly for processing payment with the payment provider (for example a banking institution), transmission of this data is typically constrained by payment network protocols to minimal characteristics of the transaction and does not include information essential to typical bookkeeping processes such as line item details (both product/service and cost), and tax components. The coding and allocation are also often reliant on the recollection of the purchaser after the fact, potentially introducing inaccuracies and requiring reference to other sources of information to corroborate the purchaser's recollection. Additionally, separation of the payment process from other aspects of the transaction introduces additional requirements in terms of reconciliation.

It is an object of the present technology to address at least one of the foregoing problems or at least to provide the public with a useful choice. Further aspects and advantages of the present disclosure will become apparent from the ensuing description which is given by way of example only.

SUMMARY

According to an aspect of the present disclosure there is provided a system including:
 a user device including:
  a display;
  at least one processor, wherein the processor is configured to:
   obtain a resource access credential authorising payment for a transaction relating to the purchase of goods or services;
   receive a user supplied transaction identifier from a user;
   generate a barcode encoding barcode data including at least a purchasing entity identifier, the resource access credential, and the user supplied transaction identifier; and
   display the barcode on the display of the user device;
 a merchant computing system including:
  an optical reader;
  at least one processor, wherein the processor is configured to:
   receive the barcode data from the optical reader on reading of the displayed barcode, in use;
   request payment for the transaction using the resource access credential; and
   produce a transaction data packet containing transaction data relating to the transaction, together with at least the purchasing entity identifier and user supplied transaction identifier.

According to an aspect of the present disclosure there is provided a method, the method including: utilizing at least one processor to execute computer code that performs the steps of:
 obtaining a resource access credential authorising payment for a transaction relating to the purchase of goods or services;
 receiving a user supplied transaction identifier from a user;
 generating a barcode encoding barcode data, the barcode data including at least a purchasing entity identifier, the resource access credential, and the user supplied transaction identifier;
 displaying the barcode on a display of a user device;
 receiving the barcode data from the optical reader on reading of the displayed barcode, in use;
 requesting payment for the transaction using the resource access credential; and
 producing a transaction data packet containing transaction data relating to the transaction, together with at least the purchasing entity identifier and user supplied transaction identifier.

According to an aspect of the present disclosure there is provided a user device including:
 a display;
 at least one processor, wherein the processor is configured to:
  obtain a resource access credential authorising payment for a transaction relating to the purchase of goods or services;
  receive a user supplied transaction identifier from the user;
  generate a barcode encoding barcode data, the barcode data including at least a purchasing entity identifier, the resource access credential, and the user supplied transaction identifier; and
  display the barcode on the display of the user device for reading by an optical reader of a merchant computing system.

According to an aspect of the present disclosure there is provided a merchant computing system including:
 an optical reader;
 at least one processor, wherein the processor is configured to:
  receive barcode data from the optical reader on reading of a barcode displayed on a display of a user device, wherein the barcode data includes at least a purchasing entity identifier, a resource access credential authorising payment for a transaction relating to the purchase of goods or services, and a user supplied transaction identifier;
  request payment for the transaction using the resource access credential; and produce a transaction data packet containing transaction data relating to the transaction, including at least a purchasing entity identifier and user supplied transaction identifier for inclusion in the transaction data packet.

In exemplary embodiments, the transaction data packet may be sent to a transaction processing service. In exemplary embodiments the transaction data packet may be sent to an entity associated with the resource access credential, for example a payment processing service or a financial institution. In exemplary embodiments the transaction data packet may be sent to an accounting service. It should be appreciated that in exemplary embodiments the transaction data packet may be sent to two or more of these entities.

The user device may be any suitable device capable of receiving the necessary user inputs and displaying the barcode. More particularly it is envisaged that the user device may be a mobile communications capable device such as a smartphone. It should be appreciated that the functionality described herein may be provided by dedicated software (for example a mobile application) or a web application accessed using a mobile web browser, and that processing may be performed at the user device or in communication with remote processing services.

The merchant computing system may be any suitable means by which purchase of goods and services from a merchant may be effected and recorded. It should be appreciated that the merchant computing system may include may operate client based, remote, or distributed software to implement the functionality described herein. In exemplary embodiments, the merchant computing system may include dedicated point of sale hardware configured to manage implementation of the functionality described herein.

It is envisaged that the transaction data packet discussed herein may be distinct to typical communication between the merchant computing system and the party providing payment (for example a payment processing service or a banking institution) to effect an electronic funds transfer authorised by a user. In exemplary embodiments the transaction data packet may be reconciled with said data, whether at the transaction processing service, payment processing service or financial institution, or accounting service.

It is envisaged that transaction data packet may enable the provision of richer data from the merchant computing system to the user, as traditional electronic funds transfer communications with financial institutions can be highly prescriptive and exclude the potential for merchant transaction information relevant to the user for accounting purposes (for example the amount charged without tax, the tax component, a description of the goods and/or services supplied, or the quantity or volume of supply).

The purchasing entity identifier may be any suitable means by which the individual or enterprise accessing the services of the transaction processing service may be identified on receipt of the transaction data packet, for example an account identifier. In an exemplary embodiment the purchasing entity identifier may identify an individual in addition to an enterprise with which they are associated—for example an employee of a company.

The user supplied transaction identifier may be any suitable means by which the associated transaction data may be distinguished from other transaction data for the purchasing entity. For example, the transaction identifier may be a series of alphanumeric characters. It is envisaged that the user supplied transaction identifier may be user specific accounting information, for example a predefined code allocated to a specific activity such as a general ledger code or a job number. In examples, the at least one processor of the user device may be configured to display a user interface, wherein the user supplied transaction identifier is received as an input into the user interface.

In an exemplary embodiment the barcode data may include a purchase justification. For example, the purchase justification may include alphanumeric characters. It is envisaged that the purchase justification may be used to provide further detail regarding the nature of the transaction for the user's reference purposes, such as a description of the nature or content of the transaction. In exemplary embodiments the user supplied transaction identifier may be a purchase justification, although it is envisaged that the purchase justification may be provided in addition to the user supplied transaction identifier. For example, the user supplied transaction identifier may be selected from a list of predetermined codes displayed in the user interface, while the purchase justification may be a customised entry by the user (for example, in a free-text field).

It should be appreciated that the resource access credential may take various forms in order to identify a resource associated with the user (for example, a payment account) and authorize payment from that resource. For example, the resource access credential may include a primary account number (PAN), or a token. For example, a "token" may include any identifier for a resource that is a substitute for an account identifier. In some embodiments, a token may be used in place of a PAN to initiate, authorize, settle or resolve a payment transaction or represent the original credential in other systems where the original credential would typically be provided. Further, in some embodiments, the token format may be configured to allow the merchant systems to identify it as a token and recognize the entity that issued the token.

In embodiments the resource access credential may include a one-time authorisation code. In an embodiment, the resource access credential may be time-limited, i.e. may timeout after a predetermined period of time. For example, the one-time authorisation code may be provided based on a Time-Based One-Time Password algorithm.

In exemplary embodiments, the resource access credential may have an associated spend limit. The spend limit may be associated with the purchasing identity (whether that be the individual user, or the entity with which the user is associated), or the merchant.

In exemplary embodiments, the associated spend limit may be specific to the intended transaction. In an exemplary embodiment, obtaining the resource access credential may include receiving a value for the transaction as a user input, and issuing the resource access credential based at least in part on the user input value. In an exemplary embodiment, obtaining the resource access credential may include receiving pre-transaction data from the merchant computing system relating to the proposed value of the transaction, and issuing the resource access credential based at least in part on the pre-transaction data. In doing so, the resource access credential may be precisely matched to the payment to be made, and reduce the likelihood of user error in comparison with a manual input of the value.

It is envisaged that the pre-transaction data may be obtained in various ways. In an exemplary embodiment the merchant computing system may be configured to generate a pre-transaction barcode encoding the pre-transaction data, to be read by the user device (for example, using a camera of a smartphone). In another exemplary embodiment a first barcode may be generated encoding the purchasing entity identifier, displayed on the user device, and read by the optical reader of the merchant computing system. The purchasing entity identifier may then be used to direct the pre-transaction data to the user device (for example in communication with the transaction processing service).

A barcode represents data in a visual, machine-readable form. In exemplary embodiments the barcode(s) may be a "two-dimensional barcode" or "matrix barcode" including an optical machine-readable representation of data, which has at least two dimensions. Two-dimensional barcodes may comprise any suitable types of patterns including rectangles, dots, hexagons, and other geometric patterns in two dimensions. One example of such a two-dimensional barcode is a QR CODE® (quick-response code), which is known for use in the field of mobile payments among other purposes.

In an exemplary embodiment the barcode data may be encoded prior to generating the barcode. It should be appreciated that a variety of encoding techniques may be used for this purpose.

It is envisaged that inclusion of the user supplied transaction identifier in the transaction data packet by the merchant computing system may assist with reducing fraudulent behaviour through subsequent manipulation of financial records. However, it should be appreciated that in aspects of the present disclosure the transaction data packet may be transmitted separately to the user supplied transaction identifier. For example, the merchant computing system may transmit the transaction data packet without the user supplied transaction identifier, on receipt of which the transaction processing computing system may request the user supplied transaction identifier from an associated user for recordal against the transaction data.

The transaction processing computing system may be configured to perform a range of functions using the user supplied transaction identifier. It is envisaged that the transaction processing computing system may be operated as software as a service (SaaS), although it should be appreciated that the transaction processing computing system may operate client based, remote, or distributed software to implement the functionality described herein. It should further be appreciated that while it is envisaged that the transaction processing computing system may operate as a distinct entity to systems of a financial institution providing payment services, and will be described as such herein, in an exemplary embodiment the transaction processing computing system may form part of the systems of such a financial institution.

In an exemplary embodiment the transaction processing computing system may provide a user interface by which a user may access and review all accounting information associated with received transaction data packet, and gain access to actions provided by the transaction processing computing system.

In an exemplary embodiment the system may include an application programming interface (API) module configured to manage interfacing with external services, for example accounting systems, payment services, merchant systems, taxation agency systems, and data sources. The API module may manage the respective authentication, authorisation, and encryption protocols required for the system to interface with the respective APIs of the services.

In an exemplary embodiment the transaction processing computing system may provide a payment interface through which the merchant computing system may request payment for the transaction using the resource access credential. In an exemplary embodiment the request for payment may be sent directly to a third-party payment provider. It is envisaged that the request may be managed separately to transmission of the transaction data packet, however embodiments are contemplated in which the transaction data packet includes the resource access credential, and receipt of the transaction data packet is treated as a request for payment.

In examples, the merchant computing system may be configured to call a first application programming interface of the transaction processing computing system transaction processing service to request payment using the resource access credential. The merchant computing system may be further configured to call a second application programming interface of the transaction processing service in order to transmit the transaction data packet to the transaction processing service.

The above and other features will become apparent from the following description, taken in conjunction with the accompanying drawings.

BRIEF DESCRIPTION OF DRAWINGS

Further aspects of the present invention will become apparent from the following description which is given by way of example only and with reference to the accompanying drawings in which:

FIG. 3 is a flow diagram of an exemplary method of producing a barcode to be displayed on a user device;

FIG. 4-1 is an exemplary user interface to be displayed on the user device;

FIG. 4-2 is another exemplary user interface to be displayed on the user device.

DETAILED DESCRIPTION

Figure 1:
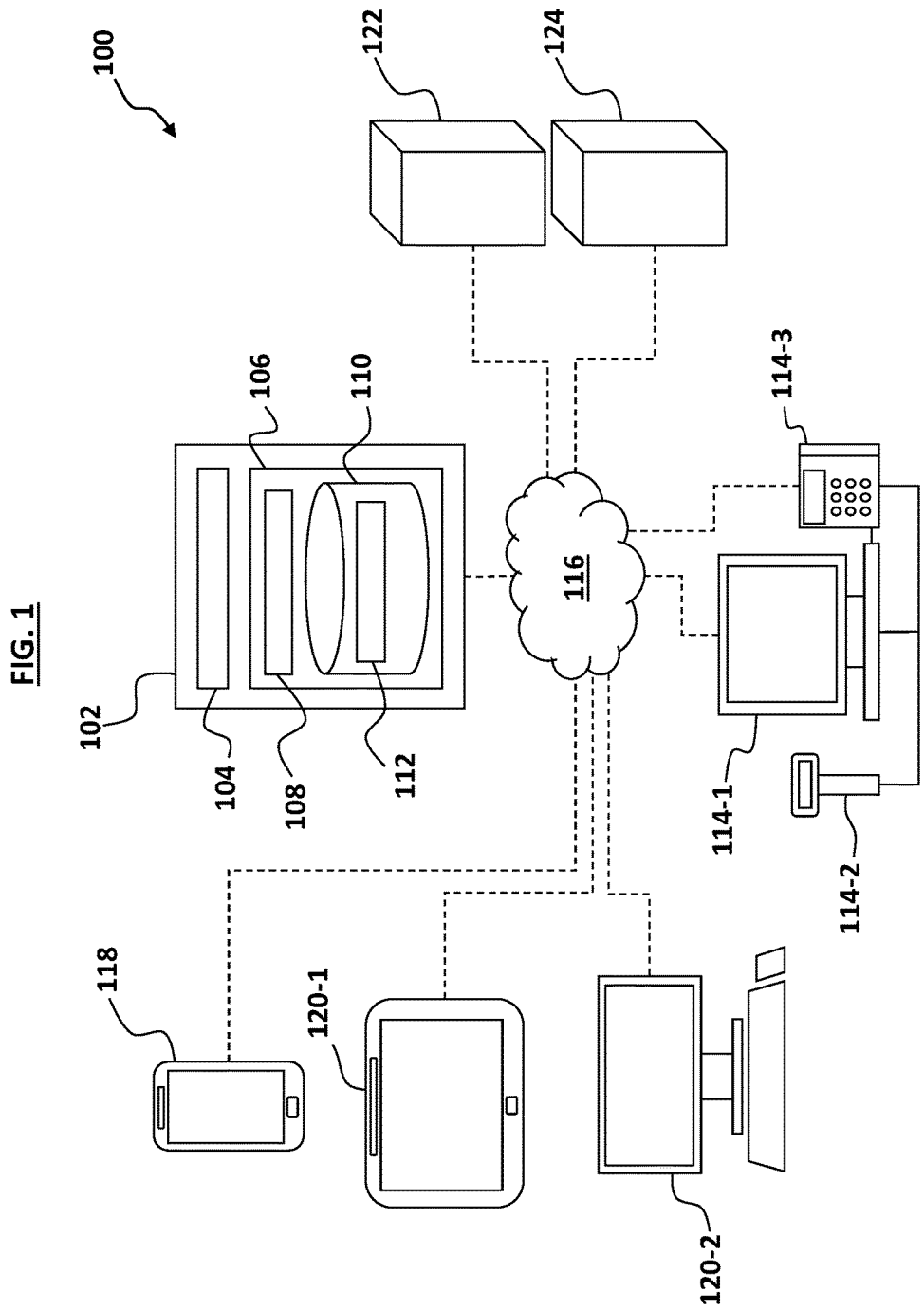
FIG. 1 is a schematic diagram of an exemplary networked system for a transaction processing service in accordance with an embodiment of the present disclosure.

FIG. 1 presents a schematic diagram of a system 100 depicting various computing devices that can be used alone or together in accordance with exemplary embodiments of the disclosure. The system 100 includes a transaction processing service 102, illustrated in this exemplary embodiment as being implemented in a server—for example one or more dedicated server devices, or a cloud-based server.

By way of example, the cloud server of the transaction processing service 102 may have processing facilities represented by a processor 104, memory 106, and other components typically present in such computing environments. In the exemplary embodiment illustrated the memory 106 stores information accessible by processor 104, the information including instructions 108 that may be executed by the processor 104 and data 110 that may be retrieved, manipulated or stored by the processor 104. The memory 106 may be of any suitable means known in the art, capable of storing information in a manner accessible by the processor, including a computer-readable medium, or other medium that stores data that may be read with the aid of an electronic device. The processor 104 may be any suitable device known to a person skilled in the art. Although the processor 104 and memory 106 are illustrated as being within a single unit, it should be appreciated that this is not intended to be limiting, and that the functionality of each as herein described may be performed by multiple processors and memories, that may or may not be remote from each other.

The instructions 108 may include any set of instructions suitable for execution by the processor 104. For example, the instructions 108 may be stored as computer code on the computer-readable medium. The instructions may be stored in any suitable computer language or format. Data 110 may be retrieved, stored or modified by processor 104 in accordance with the instructions 108. The data 110 may also be formatted in any suitable computer readable format. Again, while the data is illustrated as being contained at a single location, it should be appreciated that this is not intended to be limiting—the data may be stored in multiple memories or locations. The data 110 stored on server may include databases 112.

The system 100 also includes a merchant computing system 114-1 having point of sale (POS) payment facilitation services 114-2. It should be appreciated that in exemplary embodiments the POS payment facilitation services 114-2 may include dedicated POS hardware such as cash registers, payment terminals, payment network connections, while in other embodiments such services may be integrated with other components of the merchant computing system 114-1 (e.g. software operated on a computing device acting as a POS terminal).

The merchant computing system 114-1 further includes a barcode reading device 114-3. It should be appreciated that the barcode reading device 114-3 may utilise various technologies known in the art for reading barcodes, for example being: laser-based, CCD-based, or camera-based.

The transaction processing service 102 may communicate with the merchant computing system 114-1 via a network 116 potentially comprising various configurations and protocols including the Internet, intranets, virtual private networks, wide area networks, local networks, private networks using communication protocols proprietary to one or more companies—whether wired or wireless, or a combination thereof. For completeness, while various communications between the transaction processing service 102 and the merchant computing system 114-1 are described herein, it is envisaged that in exemplary embodiments functions of the merchant computing system 114-1 may be performed by or via the dedicated POS hardware of the services 114-2.

The system 100 also includes a user device, more particularly a mobile communications capable device such as a smartphone 118. The smartphone 118 may communicate with the transaction processing service 102 via the network 116 to gain access to functionality and data of the transaction processing service 102. Similarly, other user devices such as tablet computer 120-1, or personal computer 120-2, may be used to access certain functionality and data of the transaction processing service 102—more particularly relating to account management and post-transaction services.

The transaction processing service 102 may further communicate, for example, with financial institution services 122 in order to access payment services and financial records. It should be appreciated that reference herein to a payment service of financial institution services 122 may include services provided by more than one party, for example a third-party payment processor in cooperation with an account provider. For completeness, it should be appreciated that the payment service may be provided by an entity which is not a financial institution in the traditional sense of the term (i.e. a bank), but performs a similar function in terms of supplying payment for a transaction to a merchant. In exemplary embodiments the merchant computing system 114-1 may also communicate with the financial institution services 122.

The transaction processing service 102 may further communicate, for example, with accounting software services 124 in order to record data relating to transactions received and processed by the transaction processing service 102.

Figure 2:
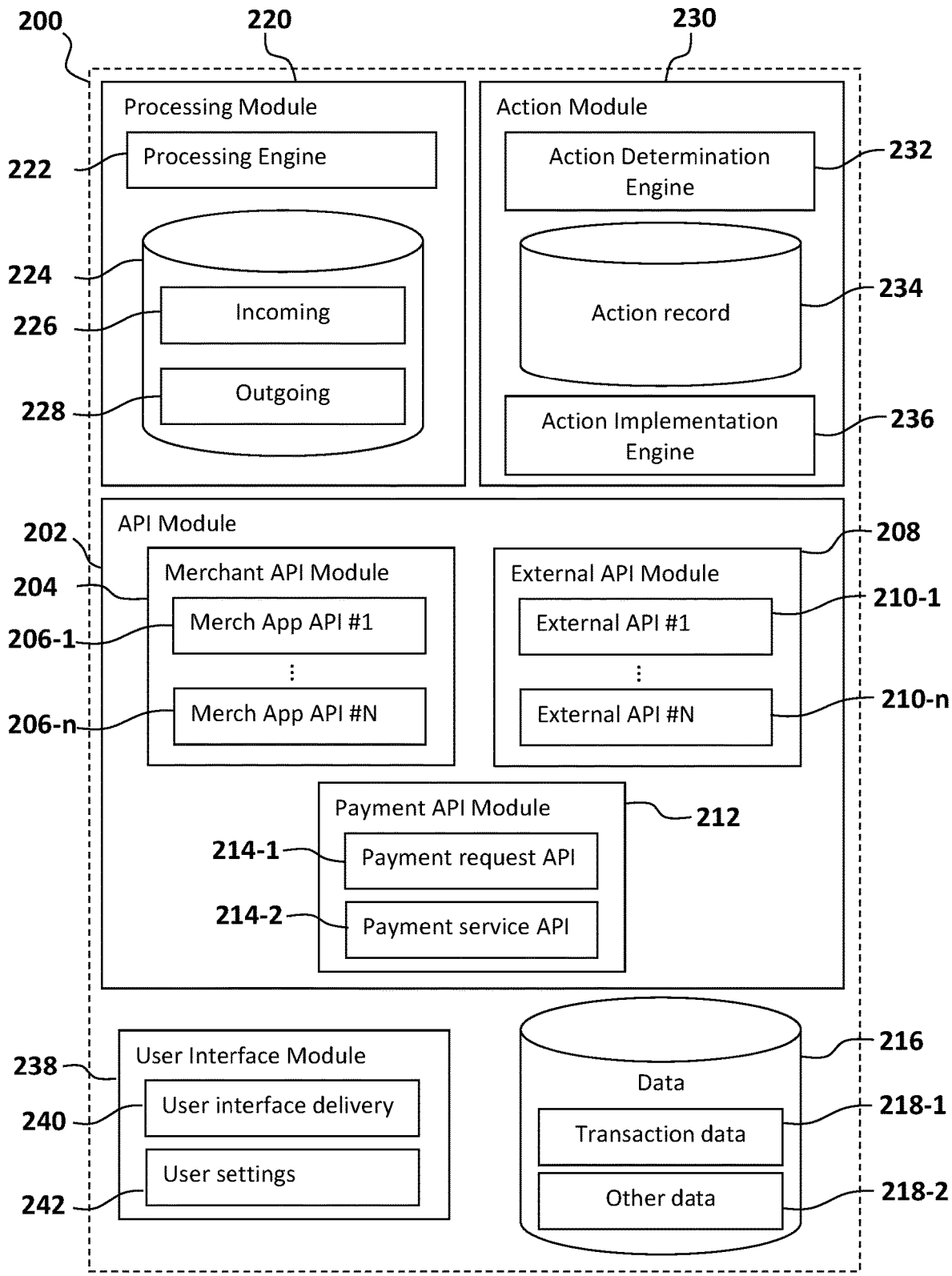
FIG. 2 is a block diagram of an exemplary transaction processing service.

FIG. 2 illustrates an exemplary structure 200 of the transaction processing service 102. The service 102 includes an application programming interface (API) module 202 configured to manage interfacing with the other services and devices within the system 100. A merchant API module 204 manages interfacing with the merchant computing system and accounting services via merchant APIs 206-1 to 206-n. An external resource API module 208 manages interfacing with other external resources via external resource APIs 210-1 to 210-n to obtain and deliver data and access functionality of the external resource—for example the financial institution services 122, and accounting software services 124.

A payment API module 212 manages interfacing with payment services. For example, a payment request API 214-1 may be provided for receiving requests for payment from a merchant and effecting payment of same. In exemplary embodiments a payment service API 214-2 may be provided for calling external payment services, for example to make the payment to the requesting party, or to make a payment to the transaction processing service 102.

Data 216 stored, or accessed by, the transaction processing service 102 may include transaction data 218-1, and non-transaction specific data 218-2. The transaction processing service 102 includes a processing module 220 configured to process the data 216. The processing module 220 includes a processing engine 222 implementing rules and algorithms to the data 216. The processing engine 222 may reference a library 224 of algorithms, including for example incoming transaction algorithms 226, and outgoing transaction algorithms 228.

The transaction processing service 102 includes an action module 230 configured to manage the identification and implementation of actions in the system 100. An action determination engine 232 may reference a record 234 of potential actions—whether available via transaction processing service 102, or via interfacing with external resources. The action module 230 includes an action implementation engine 236 configured to manage implementation of the actions determined to be available—whether automatically based on predetermined user criteria, or on authorisation by the user.

The transaction processing service 102 includes a user interface module 238 for delivery of a user interface, or at least data for use in a user interface, by which a user may access data and functionality of the transaction processing service 102. For example, the user interface may be a graphical user interface displayed on a user device. The user interface module 238 may include a user interface delivery engine 240—for example connecting to a locally installed application or web browser on the user device—and a record 242 of user settings or preferences (whether user initiated or determined by monitoring user activity).

Figures 2, 4:
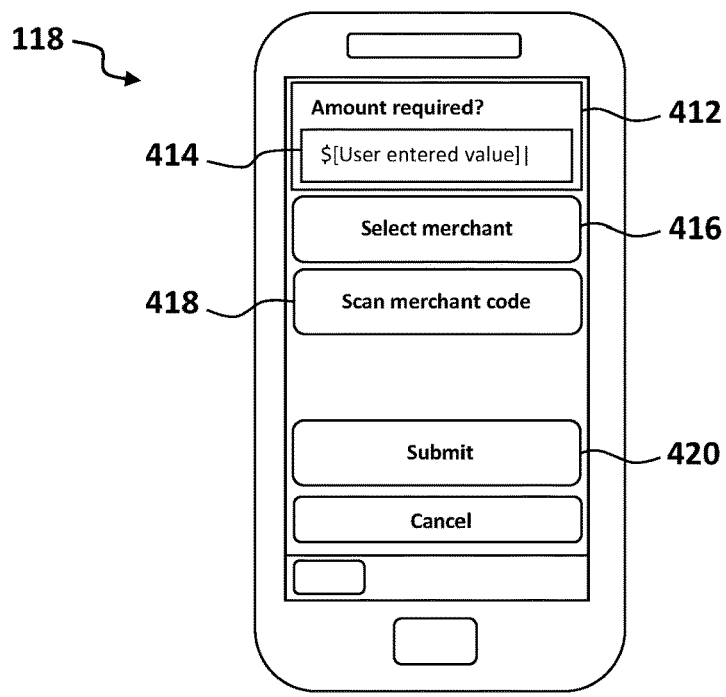

FIG. 3 shows an exemplary method 300 to be performed within the system 100. In a first step 302, the smartphone 118 receives a user supplied transaction identifier (for example, a general ledger code or a job number) and a purchase justification (for example, a custom user explanation) for a transaction via a mobile application. Referring to FIG. 4-1, a user interface 400 is displayed on the smartphone 118, providing a barcode generation button 402 to access facilities for user input of data to be included in the barcode. In the example illustrated, the user interface 400 displays a scrollable list of selectable general ledger (GL) codes 404-1 to 404-N. Selection of one of the GL codes 404 opens a text field 406 in which the purchase justification may be entered.

In a second step 304, a resource access credential authorising payment for the transaction is obtained. In an exemplary embodiment, the user interface 400 may include a selectable payment option 408 to initiate the addition of the resource access credential to the data to be included in the barcode—although embodiments are contemplated in which the request may be initiated automatically on completion of certain tasks (for example, on scanning a barcode displayed by the merchant in which details of the intended transaction are encoded). In an exemplary embodiment, a request may be sent from the mobile application to the transaction processing service 102, for example via an API, with the resource access credential returned as a one time authorization code (OTAC).

In exemplary embodiments the OTAC may have an associated time limit for use—i.e. may be configured to timeout if not authenticated within a predetermined period. For example, the OTAC may be generated based on a Time-Based One-Time Password algorithm. The timeout means that a user must be connected to the transaction processing service 102, and the OTAC subsequently authenticated, within a limited period to reduce the likelihood of fraudulent behaviour. The timeout may be selected to approximate a time window within which the transaction occurs (i.e. between the generation of the QR code for scanning and the resulting authorisation call), reducing the likelihood of a copy of the code being able to be used fraudulently before the original is authenticated. Because the transaction processing service 102 acts as both the provider and receiver of the OTAC, there is a reduced likelihood of validation error due to unsynchronised clocks and latency.

In an exemplary embodiment, the OTAC may have a spend limit attached to it. In embodiments this may be an upper spend limit generally associated with the user, with the selected GL code, and/or with the merchant. In other embodiments the spend limit may be for a specific value associated with the particular transaction. For example, selection of the payment option 408 may initiate a detail collection process for inclusion with the request for the resource access credential. Referring to FIG. 4-2, a manual value input option 412 may be presented for the user to enter the amount of the transaction (for example, having a text field 414 for entry of the amount being requested). The user may also be presented with a merchant selection option 416 to identify the merchant to which the payment is to be made (for example, from a drop-down list or via a search field). In an exemplary embodiment, the merchant may display at least one barcode for the value of the transaction which may be captured by a camera of the smartphone on selection of a scan merchant code option 418—whether that be a barcode generated at the point of sale for the totality of the transaction, or static barcodes associated with individual items which may be individually read and compiled. On collection of the necessary information, the request may be made using a submit request option 420.

In step 306 the mobile application generates a barcode including a purchasing entity identifier associated with the user, the user supplied transaction identifier in the form of the selected GL code 404, the purchase justification, and the resource access credential. In step 308 the barcode is displayed in the user interface 400 of the smartphone 118—for example QR code 410 of FIG. 4-1.

Figure 5:
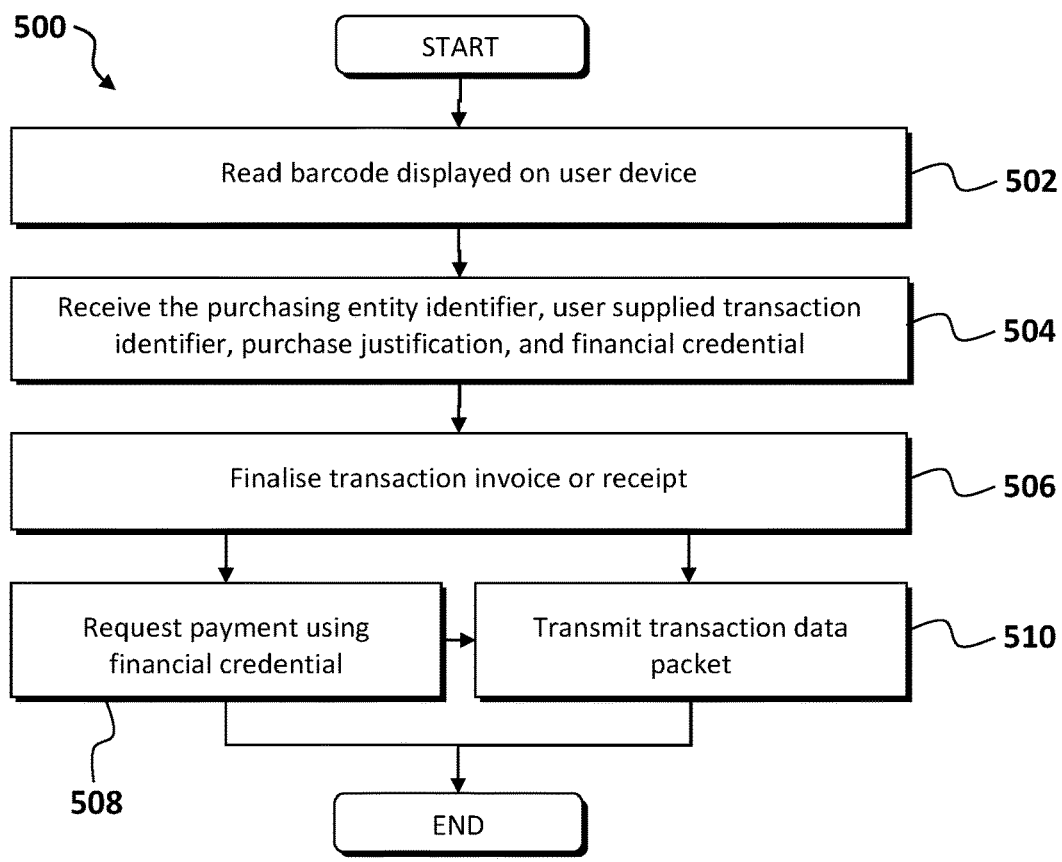
FIG. 5 is a flow diagram of an exemplary method of obtaining information from a user device and requesting payment for a transaction.

FIG. 5 shows an exemplary method 500 to be performed within the system 100. In step 502 the QR code 410 displayed on the smartphone 118 is read using the barcode reading device 114-3 of the merchant computing system 114-1. In step 504 the QR code 410 is processed to obtain the purchasing entity identifier, the selected GL code 404, the purchase justification, and the resource access credential. In step 506 the transaction invoice or receipt is finalised (i.e. the merchant processes the transaction). In step 508 the merchant computing system 114-1 submits a request for payment to the transaction processing service 102 using the resource access credential, for example using the payment request API 214-1. On success the OTAC may be marked as used by the transaction processing service 102, and the transaction indicated as being successful. It should be appreciated that the actual payment may be made to the merchant in a background task. In step 510 the merchant computing system transmits a transaction data packet to one or more of the transaction processing service 102 and the financial institution services 122 for further processing. The transaction data packet contains transaction data relating to the transaction, together with at least the purchasing entity identifier, the GL code(s) 404, and the purchase justification.

It should be appreciated that in exemplary embodiments the request for payment using the resource access credential may be submitted and authenticated prior to finalizing the transaction invoice or receipt, or transmission of the transaction data packet.

The invention(s) may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the disclosure and without diminishing its attendant advantages. It is therefore intended that such changes and modifications be included within the present disclosure.

For a firmware and/or software (also known as a computer program) implementation, the techniques of the present disclosure may be implemented as computer-readable instructions (for example, procedures, functions, and so on) that perform the functions described. It should be appreciated that the present disclosure is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor. A general-purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers, whether cloud based or dedicated, and network connections as known in the art.

In various embodiments, one or more cloud computing environments may be used to create, and/or deploy, and/or operate at least part of the software system that can be any form of cloud computing environment, for example: a public cloud, a private cloud, a virtual private network (VPN), a subnet, a Virtual Private Cloud (VPC), or any other cloud-based infrastructure known in the art. It should be appreciated that a service may utilize, and interface with, multiple cloud computing environments.

The steps of a method, process, or algorithm described in connection with the present disclosure may be embodied directly in hardware, in a software module executed by one or more processors, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

Reference throughout this specification to "one embodiment" or "an embodiment" (or the like) means that a particular feature, structure, or characteristic described in connection with the embodiment is included in at least one embodiment of the disclosure. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the foregoing description, numerous specific details are provided to give a thorough understanding of the exemplary embodiments. One skilled in the relevant art may well recognize, however, that embodiments of the disclosure can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the disclosure will be best understood by reference to the figures. The foregoing description is intended only by way of example and simply illustrates certain selected exemplary embodiments of the disclosure. It should be noted that the flowchart and block diagrams in the figures illustrate the architecture, functionality, and operation of possible implementations of systems, apparatuses, methods and computer program products according to various embodiments of the disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps, that is to say, in the sense of "including, but not limited to".

It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A system including:
   a user device including:
      a display;
      at least one processor, wherein the processor is configured to:
         obtain a resource access credential authorising payment for a transaction relating to the purchase of goods or services;
         receive a user supplied transaction identifier from a user;
         generate a barcode encoding barcode data including at least a purchasing entity identifier, the resource access credential, and the user supplied transaction identifier; and
         display the barcode on the display of the user device;
   a merchant computing system including:
      an optical reader;
      at least one processor, wherein the processor is configured to:
         receive the barcode data from the optical reader on reading of the displayed barcode, in use;
         request payment for the transaction using the resource access credential; and
         produce a transaction data packet containing transaction data relating to the transaction, together with at least the purchasing entity identifier and the user supplied transaction identifier.

2. The system of claim 1, wherein the at least one processor of merchant computing system is configured to call a first application programming interface of a transaction processing service to request payment using the resource access credential.

3. The system of claim 2, wherein the transaction processing service provides the resource access credential to the user device for inclusion in the barcode.

4. The system of claim 2, wherein the at least one processor of the merchant computing system is configured to transmit the transaction data packet to the transaction processing service.

5. The system of claim 4, wherein the at least one processor of the merchant computing system is configured to call a second application programming interface of the transaction processing service in order to transmit the transaction data packet to the transaction processing service.

6. The system of claim 1, wherein the at least one processor of the user device is configured to display a user interface, and wherein the user supplied transaction identifier is received as an input into the user interface.

7. The system of claim 1, wherein the resource access credential includes a one-time authorisation code.

8. The system of claim 1, wherein the resource access credential is time-limited.

9. The system of claim 8, wherein the resource access credential is based on a Time-Based One-Time Password algorithm.

10. The system of claim 1, wherein the resource access credential has an associated spend limit.

11. The system of claim 10, wherein obtaining the resource access credential includes receiving a value for the transaction as a user input, and issuing the resource access credential based at least in part on the user input value.

12. The system of claim 10, wherein obtaining the resource access credential includes receiving pre-transaction data from the merchant computing system relating to the proposed value of the transaction, and issuing the resource access credential based at least in part on the pre-transaction data.

13. The system of claim 1, wherein the barcode is a two-dimensional barcode.

* * * * *